(12) United States Patent
Gates et al.

(10) Patent No.: US 6,444,126 B1
(45) Date of Patent: Sep. 3, 2002

(54) SYSTEM AND METHOD FOR TREATING SANITARY WASTEWATER FOR ON-SITE DISPOSAL

(75) Inventors: Patrick T. Gates, Cincinnati; Todd M. Gates, Loveland, both of OH (US)

(73) Assignee: T. M. Gates, Inc., Milford, OH (US)

(*) Notice: Subject to any disclaimer, the term of this patent is extended or adjusted under 35 U.S.C. 154(b) by 36 days.

(21) Appl. No.: 09/665,263

(22) Filed: Sep. 19, 2000

(51) Int. Cl.⁷ .............................. C02F 3/10; C02F 3/30
(52) U.S. Cl. ................ 210/612; 210/617; 210/630; 210/747; 210/121; 210/150; 210/202; 210/259; 210/920; 210/532.2
(58) Field of Search ................ 210/605, 610, 210/612, 615, 616, 617, 630, 121, 150, 182, 195.1, 202, 259, 920, 620, 747, 170, 220, 532.2

(56) References Cited

U.S. PATENT DOCUMENTS

| | | | |
|---|---|---|---|
| 3,930,998 A | * | 1/1976 | Knopp et al. |
| 4,179,374 A | * | 12/1979 | Savage et al. |
| 4,279,753 A | | 7/1981 | Nielson et al. |
| 4,415,454 A | * | 11/1983 | Fuchs |
| 4,465,594 A | * | 8/1984 | Laak |
| 4,620,929 A | * | 11/1986 | Hofmann |
| 4,725,357 A | * | 2/1988 | Downing et al. |
| 4,892,658 A | * | 1/1990 | Martin et al. |
| 5,078,882 A | | 1/1992 | Northrop |
| 5,185,080 A | | 2/1993 | Boyle |
| 5,205,935 A | | 4/1993 | Ruocco |
| 5,217,616 A | | 6/1993 | Sanyal et al. |
| 5,254,254 A | * | 10/1993 | Shin et al. |
| 5,298,164 A | | 3/1994 | Hapach et al. |
| 5,480,551 A | * | 1/1996 | Chudoba et al. |
| 5,582,732 A | | 12/1996 | Mao et al. |
| 5,618,412 A | * | 4/1997 | Herding et al. |

(List continued on next page.)

FOREIGN PATENT DOCUMENTS

| | | | |
|---|---|---|---|
| DE | 3917451 | * | 5/1989 |
| EP | 0087129 | * | 2/1983 |

OTHER PUBLICATIONS

"T.M. Gates, Inc. providing innovative and cost–effective solutions for environmental problems", TMG Environmental and Applied Earth Science Consultants, T.M. Gates, Inc. brochure booklet, 11 pages.

Primary Examiner—David A. Simmons
Assistant Examiner—Fred Prince
(74) Attorney, Agent, or Firm—Steven J. Rosen

(57) ABSTRACT

An exemplary embodiment of the invention includes a wastewater treatment plant having, in serial fluid flow relationship, a wastewater source, a wastewater treatment plant, and a discharge site. The wastewater treatment plant has, in serial fluid flow relationship, an aerobic bioreactor in fluid flow communication with the wastewater source and an anoxic bioreactor in fluid flow communication with the discharge site. Fixed film packing for growing microbes is disposed in first and second tanks of the first and second bioreactors, respectively. A primary holding tank is disposed between the wastewater source and the aerobic bioreactor. A first pump is used for pumping liquid out of the primary hold tank through a first pressure line into the first tank to a pressure line outlet in a bottom of the first tank. The liquid in the first tank is flowed out through a first tank outlet near a top of the first tank, through a transfer pipe in fluid communication with the first tank outlet, and into a bottom of the second tank through a transfer pipe outlet at the bottom of the second tank. A blower is used to supply air to the bottoms of the first and second tanks. The liquid in the second tank is flowed out through a second tank outlet near a top of the second tank, through an exit pipe in fluid communication with the second tank outlet and then into a secondary holding tank which is disposed in fluid communication with the discharge site.

38 Claims, 8 Drawing Sheets

U.S. PATENT DOCUMENTS

| | | |
|---|---|---|
| 5,624,562 A | 4/1997 | Scroggins |
| 5,653,883 A | 8/1997 | Newman et al. |
| 5,798,044 A * | 8/1998 | Strohmeier et al. |
| 5,807,485 A | 9/1998 | Caplan et al. |
| 5,814,514 A | 9/1998 | Steffan et al. |
| 5,827,010 A | 10/1998 | Hassett |
| 5,908,555 A | 6/1999 | Reinsel et al. |
| 5,961,830 A | 10/1999 | Barnett |
| 6,007,712 A | 12/1999 | Tanaka et al. |
| 6,039,873 A | 3/2000 | Stahler |
| 6,039,874 A | 3/2000 | Teran et al. |
| 6,086,765 A | 7/2000 | Edwards |
| 6,126,829 A * | 10/2000 | Gunnarsson et al. |
| 6,183,644 B1 * | 2/2001 | Adams et al. |

\* cited by examiner

SYSTEM AND METHOD FOR TREATING SANITARY WASTEWATER FOR ON-SITE DISPOSAL

BACKGROUND OF THE INVENTION

1. Field of the Invention

The present invention relates generally to treating sanitary wastewater and, more particularly, the purification of solids-free wastewater utilizing submerged fixed film biological technology and bioreactors.

2. Discussion of the Background Art

In areas of the country where municipal or publicly owned treatment systems do not provide service for the disposal of sanitary wastes, sanitary wastewater from residential, commercial and industrial sites is treated on-site in privately owned treatment systems and either disposed of, reused on-site or discharged under a permit regulated by the National Pollutant Discharge Elimination System (NPDES) and/or anti-degradation regulations. In areas where an NPDES discharge is possible, discharge may not be permitted since many package sanitary treatment plants cannot consistently achieve the requisite discharge standards. This is partially true if the discharge is to a designated National, State, Scenic or otherwise protected surface water body, which requires compliance with anti-degradation regulations. The purpose of the National Pollutant Discharge Elimination System (NPDES) Program is to protect human, health and the environment. The Clean Water Act requires that all point sources discharging pollutants into waters of the United States must obtain an NPDES permit. United States EPA definition of point sources includes means discrete conveyances such as pipes or man made ditches. Although individual residential treatment systems do not require permits, larger facilities must obtain permits if they discharge directly to surface waters.

As a consequence, the inability to treat and discharge sanitary waste in an acceptable and/or cost effective manner greatly restricts residential, commercial and industrial development. Residential, commercial and industrial development is restricted in areas where low permeability soils prohibit or restrict wastewater discharge to leach fields, evaporative and transpiration fields or mound systems. Ground saturation and the leakage of these systems results in a non-point source discharge of poorly treated contaminated liquids to surrounding surface water bodies (e.g., lakes, rivers, streams). Sanitary wastewater discharged from agricultural sites such as cattle, pig, and poultry concentrated feed operations (feed lots), require greater degrees of treatment due to existing, proposed, and anticipated regulatory standards to prevent contamination of surface water bodies.

In some areas, solids-free sanitary wastewater is treated using constructed wetlands. However, due to the temperature sensitive nature of the micro-organisms involved in the sanitary waste degradation process, constructed wetlands can have poor waste treatment efficiencies in geographic regions that experience cold temperature periods. Due to more stringent regulatory discharge requirements and an ever increasing population, public sanitary treatment facilities continually are forced to expand and upgrade to improve water quality and increase discharge capacity. However, due to increasing regulatory requirements, in particular anti-degradation requirements, an increase in discharge capacity requires corresponding decrease in pollutant concentration so that the mass loading of contaminants to the water body remains the same, despite increasing the flow volume.

Historically, the treatment of sanitary wastewater has employed aerobic and, to a lesser extent, anaerobic biological treatment technology utilizing micro-organisms in a suspended growth or, to a lesser extent, fixed film aqueous environment. Unfortunately, the control of environmental factors such as temperature, pressure, and airflow for existing systems is rather haphazard and significant variation in treatment efficiencies can occur.

There is a great need to provide improved methods and systems for treating sanitary wastewater so that the effluent can comply with existing and increasingly restrictive future water quality standards. There is a need to mitigate effluent discharge restrictions currently imposed on existing wastewater treatment technologies and allow residential, commercial and industrial development in areas where access to sanitary municipal/publicly owned treatment systems (sewers) are not available and/or in areas where low permeability soils exist and preclude on-site discharge of treated sanitary wastewater produced by current technology. There is a great need to provide improved methods and systems for treating wastewater discharge from agricultural facilities.

There is a great need to provide improved methods and systems for treating wastewater in place of constructed wetlands or, alternatively, in combination with constructed wetlands to substantially improve the effluent water quality from the constructed wetland, which is either discharged and/or allowed to percolate into the ground. There is also a need to provide improved methods and systems for treating wastewater from municipal wastewater treatment facilities, which are often publicly owned, due to more stringent regulatory discharge requirements and an ever increasing population. Public sanitary treatment facilities, such as municipal wastewater treatment facilities, are continually upgrading to achieve better water quality and increase discharge capacity. Due to increasing regulatory requirements, in particular anti-degradation requirements, an increase in discharge capacity requires corresponding decrease in pollutant concentration so that the mass loading of contaminants to the water body remains the same despite increasing the flow volume. Therefore, a need exists for a tertiary polishing of municipal sanitary wastewater to achieve higher levels of wastewater treatment efficiency, thereby, increasing the potential capacity of the municipal wastewater treatment system.

SUMMARY OF THE INVENTION

An exemplary embodiment of the invention includes a wastewater treatment plant having, in serial fluid flow relationship, a wastewater source, a wastewater treatment plant, and a discharge site. The wastewater treatment plant has, in serial fluid flow relationship, an aerobic bioreactor in fluid flow communication with the wastewater source and an anoxic bioreactor in fluid flow communication with the discharge site.

Fixed film packing for growing microbes is disposed in first and second tanks of the first and second bioreactors, respectively. A primary holding tank is disposed between the wastewater source and the aerobic bioreactor. A first pumping means is used for pumping liquid out of the primary hold tank through a first pressure line leading into the first tank through a pressure line outlet in a bottom of the first tank. One embodiment of the first pumping means is a float activated primary hold tank pump which is activated by a normal level float switch. Some embodiments of the invention have a septic tank between a solids laden wastewater source and the primary holding tank.

The liquid in the first tank is flowed out through a first tank outlet near a top of the first tank, through a transfer pipe in fluid communication with the first tank outlet, and into a bottom of the second tank through a transfer pipe outlet at the bottom of the second tank. An air supply means, such as a blower, is used to supply air to the bottoms of the first and second tanks. The liquid in the second tank is flowed out through a second tank outlet near a top of the second tank, through an exit pipe in fluid communication with the second tank outlet and into a secondary holding tank, which is in fluid communication with the discharge site.

A bioreactor building encloses the aerobic and anoxic bioreactors and a heater or some other heating device is suitably located in the building and operable to control temperature inside of the building. At least one blower is connected in fluid communication with air lines that lead to air distribution manifolds near the bottoms of the first and second tanks. The air distribution manifolds have air outlets.

A first fluid distribution manifold is connected to the first pressure line near the bottom of the first tank and a second fluid distribution manifold is connected to the transfer pipe near the bottom of the second tank. The fluid distribution manifolds have downwardly facing fluid flow openings that discharge fluid downwardly towards the bottom of the tanks. The manifolds are constructed from straight pipes connected by T fittings. The T fittings have downwardly facing collars and bushings that fit and are received inside of the collars and include the fluid flow openings to discharge the fluid downwardly towards the bottom of the tanks. The fluid flow openings in the bushings are used to help regulate the fluid flow through the fluid distribution manifolds.

In one embodiment, the bushings in each of the fluid distribution manifolds have graduated size fluid flow openings radially across the fluid distribution manifold which increase in size in a direction going away from a manifold inlet of each of the fluid distribution manifolds. The air outlets are graduated in size and increase in size in a direction going away from the air lines.

Vent pipes are located at the tops of the tanks and are connected to a vent manifold, which in turn is vented to an exhaust pipe extending outside of the bioreactor building. A vent air control valve is operably installed in the vent manifold. A controller operably connected to the valves and heater in the bioreactor building is programmed to control temperature inside of the building and the bioreactors and to control process of the plant. The controller is programmed to maintain a first temperature in the first bioreactor between 45/F. and 120/F. and a second temperature in the second bioreactor between 55/F. and 120/F. The controller is further programmed to maintain airflow from the blower through first bioreactor between 0.034 to 0.067 cubic feet of air per minute (cfm) per cubic foot of packing in the first bioreactor and through the second bioreactor between 0.013 to 0.027 cfm of air per cubic foot of the packing in the second bioreactor. The controller is further programmed to provide a wastewater resident time in each of the bioreactors in a range of between 12 and 24 hours.

BRIEF DESCRIPTION OF THE DRAWINGS

The novel features believed characteristic of the present invention are set forth and differentiated in the claims. The invention is more particularly described in conjunction with the accompanying drawings in which:

DETAILED DESCRIPTION

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Figure 1:
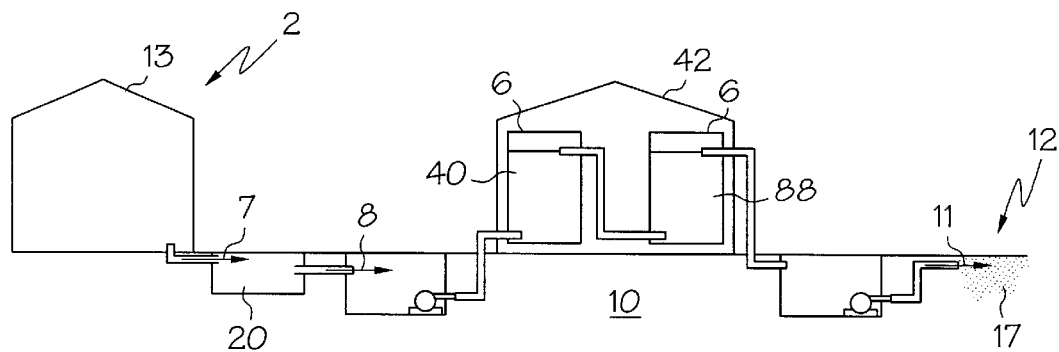
FIG. 1 is a schematic illustration of an exemplary embodiment of an on-site sanitary wastewater treatment system of the present invention.

Illustrated schematically in FIG. 1 is an exemplary embodiment of the present invention for a wastewater treatment system 10 using biodegradation for treating solids-free wastewater 8 for on-site disposal. The system 10 is for remediation of effluent discharged from a wastewater source 2 and includes a wastewater treatment plant 4 having multiple fixed film bioreactors 6, to remediate solids-free wastewater from the wastewater source 2 and discharge the remediated effluent as safe water 11 into the environment at a discharge site 12. The exemplary embodiment illustrated herein includes first and second bioreactors 40 and 88 enclosed in a bioreactor building 42. The first bioreactor 40 is an aerobic bioreactor and the second bioreactor 88 is an anoxic bioreactor. The first exemplary wastewater source 2 illustrated in FIG. 1 is a commercial site 13 such as a convenience store or gasoline station and convenience store as is often found in suburban and rural areas. The discharge site 12 is illustrated as a leach field 17.

Figure 2:
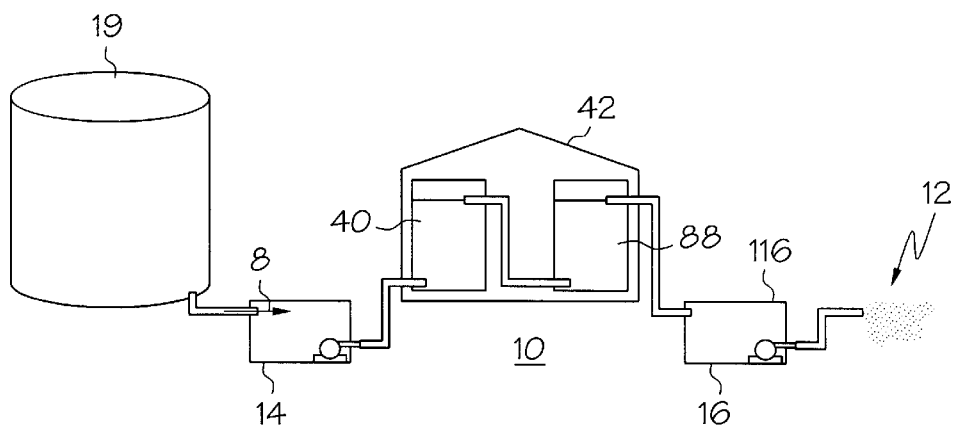
FIG. 2 is a schematic illustration of an alternative embodiment of the invention using the sanitary wastewater treatment system to polish wastewater from a municipal sanitary treatment facility.
Figure 3:
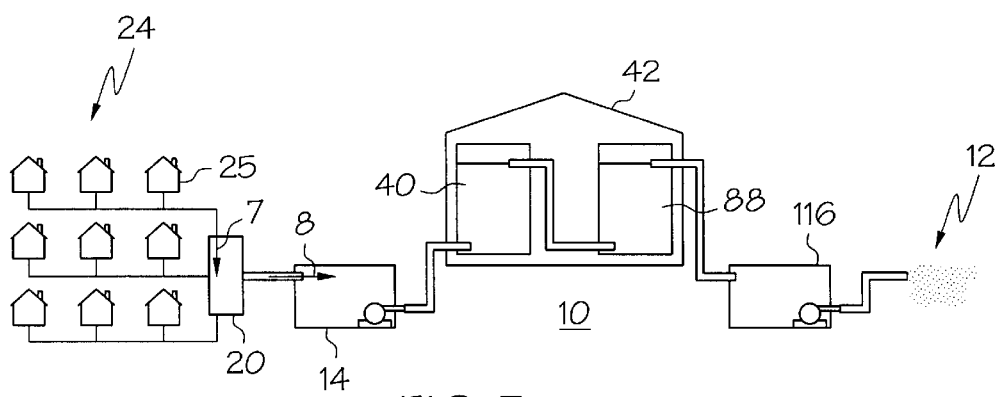
FIG. 3 is a schematic illustration of a second alternative embodiment of the invention using the sanitary wastewater treatment system to treat wastewater from a group of houses such as a residential subdivision or development.

The system 10 is an in-situ wastewater treatment system that can be used with a variety of wastewater sources including residential, commercial and industrial sources. It is particularly useful in areas where access to sanitary municipal/publicly owned treatment systems (sewers) are not available and/or low permeability soils exist, which would otherwise preclude on-site discharge of treated sanitary wastewater such as that produced by prior art or conventional technologies. The wastewater sources includes agricultural facilities (not particularly illustrated in the FIGS.) such as cattle, pig, and poultry concentrated feed operations (feed lots), municipal or publicly owned sanitary treatment facilities 19 illustrated in FIG. 2, wherein the invention is used for the polishing of wastewater from such facilities, a residential subdivision 24, illustrated in FIG. 3, containing several or many residential houses 25 that all flow their solids laden wastewater 7 through sewer pipes or other pipes to a centralized septic tank 20 from which solids-free waste water 8 is flowed to the wastewater treatment system 10 of the present invention.

Figure 4:
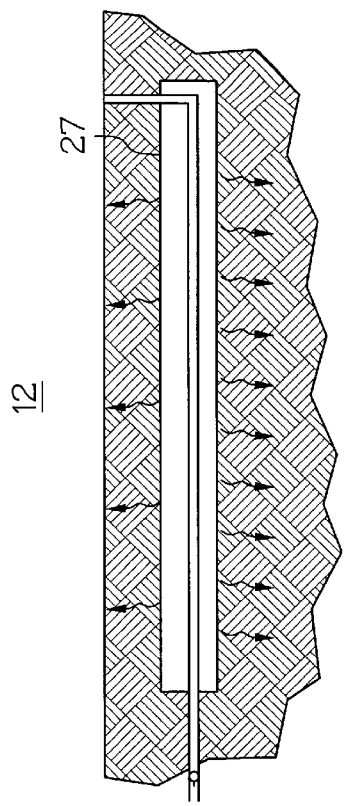
FIG. 4 is a schematic illustration of a mound system discharge for the sanitary wastewater treatment system illustrated in FIG. 1.
Figure 5:
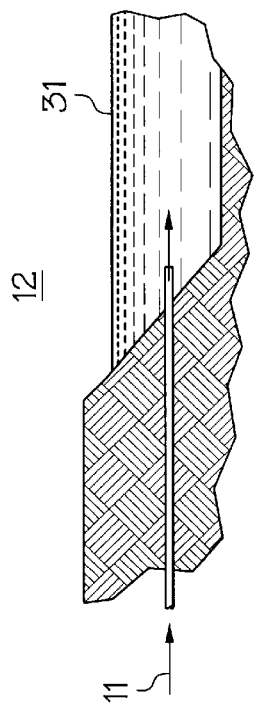
FIG. 5 is a schematic illustration of a leach field with evaporative transpiration discharge for the sanitary wastewater treatment system illustrated in FIG. 1.
Figure 7:
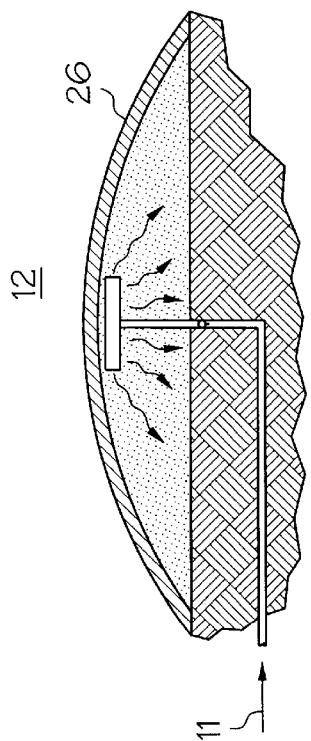
FIG. 7 is a schematic illustration of surface water discharge for the sanitary wastewater treatment system illustrated in FIG. 1.
Figure 6:
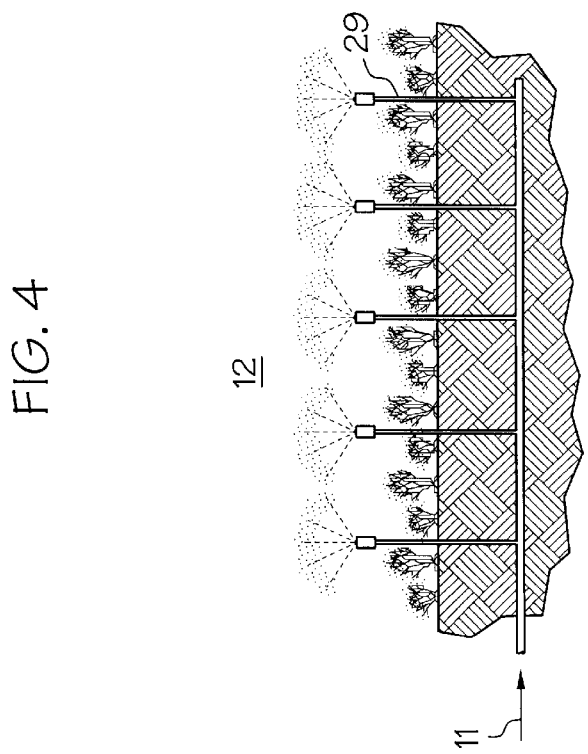
FIG. 6 is a schematic illustration of an irrigation field discharge for the sanitary wastewater treatment system illustrated in FIG. 1.

Various discharge sites 12 are illustrated in FIGS. 4–7. FIG. 4 illustrates a mound system 26 for a discharge site 12. FIG. 5 illustrates a leach field 27 incorporating evaporative transpiration and FIG. 6 illustrates an irrigation field 29 for the discharge site 12 for the sanitary wastewater treatment system 10. FIG. 7 illustrates a surface water body 31 such as a lake or stream or river as the discharge site 12 for the sanitary wastewater treatment system 10.

Figure 8:
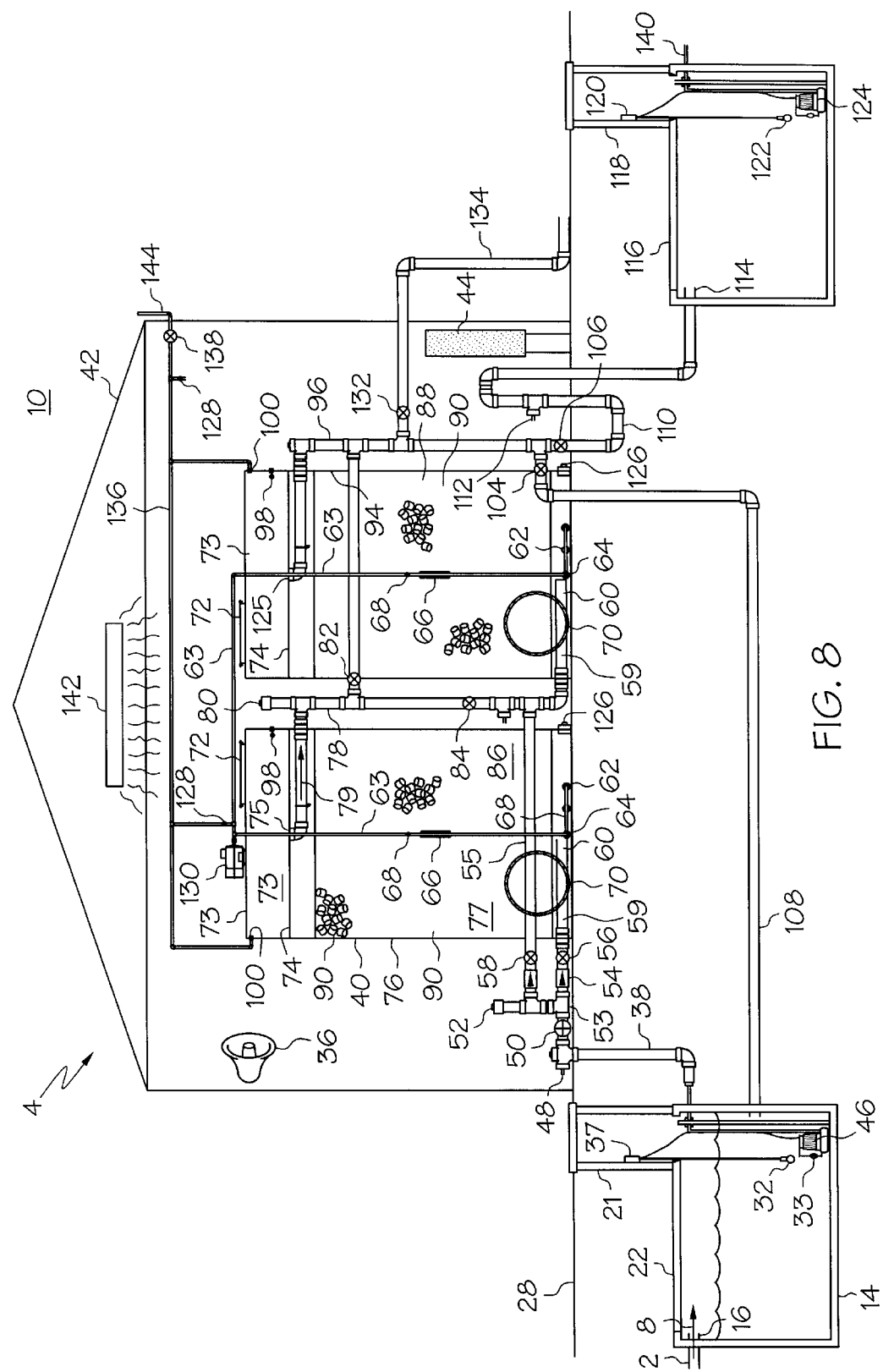
FIG. 8 is a schematic illustration of the sanitary wastewater treatment plant with serial in line aerobic and anoxic bioreactors of the system in FIG. 1.

Illustrated schematically in FIG. 8 is a more detailed exemplary embodiment of the wastewater treatment system 10 for treating the solids-free wastewater 8 from the wastewater sources 2 disclosed above. The flow of the solids-free wastewater 8 from the wastewater source 2 enters a primary holding tank 14 through an inlet 16. The commercial source such as a convenience store or the residential source has a septic tank 20 between the source and the primary holding tank 14 to remove solids from solids laden wastewater 7 and provide the solids-free wastewater 8. Alternatively, the solids-free wastewater 8 enters the primary holding tank 14 from a constructed wetland municipal wastewater treatment plant or concentrated animal feeding operation which typically use surface impoundments to remove solids.

The primary holding tank 14 provides flow equalization and storage of the wastewater 8 in case of a power outage. The sizing of the primary holding tank 14 varies depending upon concentration of waste and volumetric flow of the wastewater 8 into the primary holding tank. A riser 21 extending from a tank top 22 of the holding tank 14 to ground surface 28 allows access to the primary holding tank. The wastewater 8 in the primary holding tank 14 is pumped out using a float activated primary hold tank pump 46 which is activated by a normal level float switch 33. An alternative pumping means uses gravity where the solids-free wastewater 8 is flowed out of the primary holding tank 14 by gravity by placing the bioreactors 6 at a sufficiently lower elevation than the elevation of the primary holding tank.

A high-level float switch 32 is used to activate an alarm 36 that indicates and warns of a high liquid level of the wastewater 8 in the holding tank 14. All electrical devices in the primary holding tank are connected to a junction box 37 which is connected to a computerized controller such as a main Program Logic Controller (PLC) 44.

Under normal operating conditions, the primary holding tank pump 46 pumps the wastewater 8 through a first pressure line 38 into the first bioreactor 40. To prevent slug loading, flow into the first bioreactor is regulated using a first shutoff valve 56 controlled by a sequence timer in the PLC 44. If the first bioreactor 40 needs servicing, the flow can be temporarily diverted to the second bioreactor 88 by closing the first shutoff valve 56 and opening a second shutoff valve 58 in a bypass line 55. The bypass line 55 is connected to a T fitting 53 between the first shutoff valve 56 and the primary holding tank pump 46. A check valve 54 is installed in the first pressure line 38 between the T fitting and the first shutoff valve 56 to prevent backflow into the primary holding tank. A totalizing meter 50 is installed to meter the system flow and can transmit data to the PLC 44 that is used to control the process.

Figure 9:
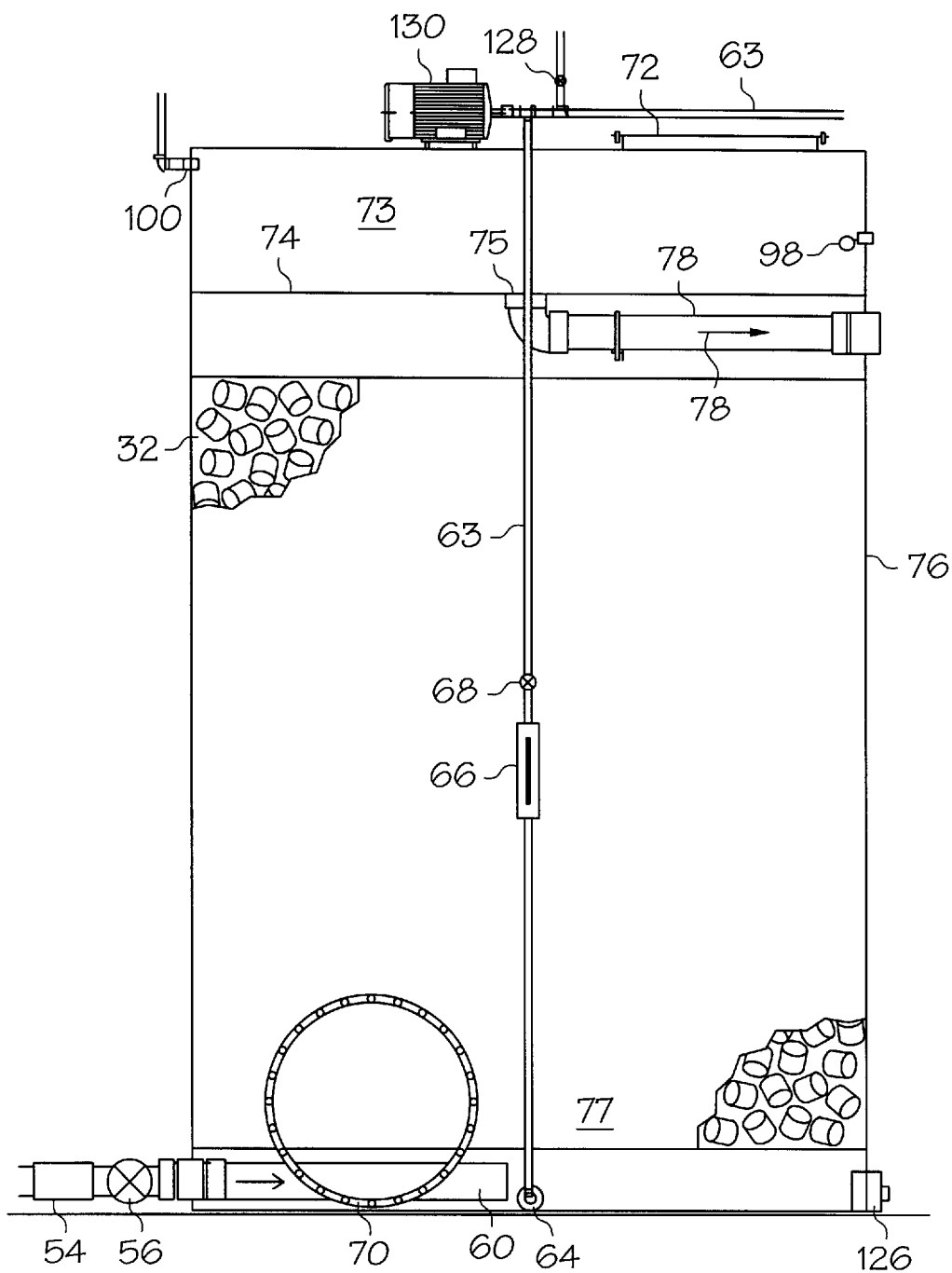
FIG. 9 is a schematic illustration of a bioreactor tank in the sanitary wastewater treatment plant in FIG. 8.
Figure 10:
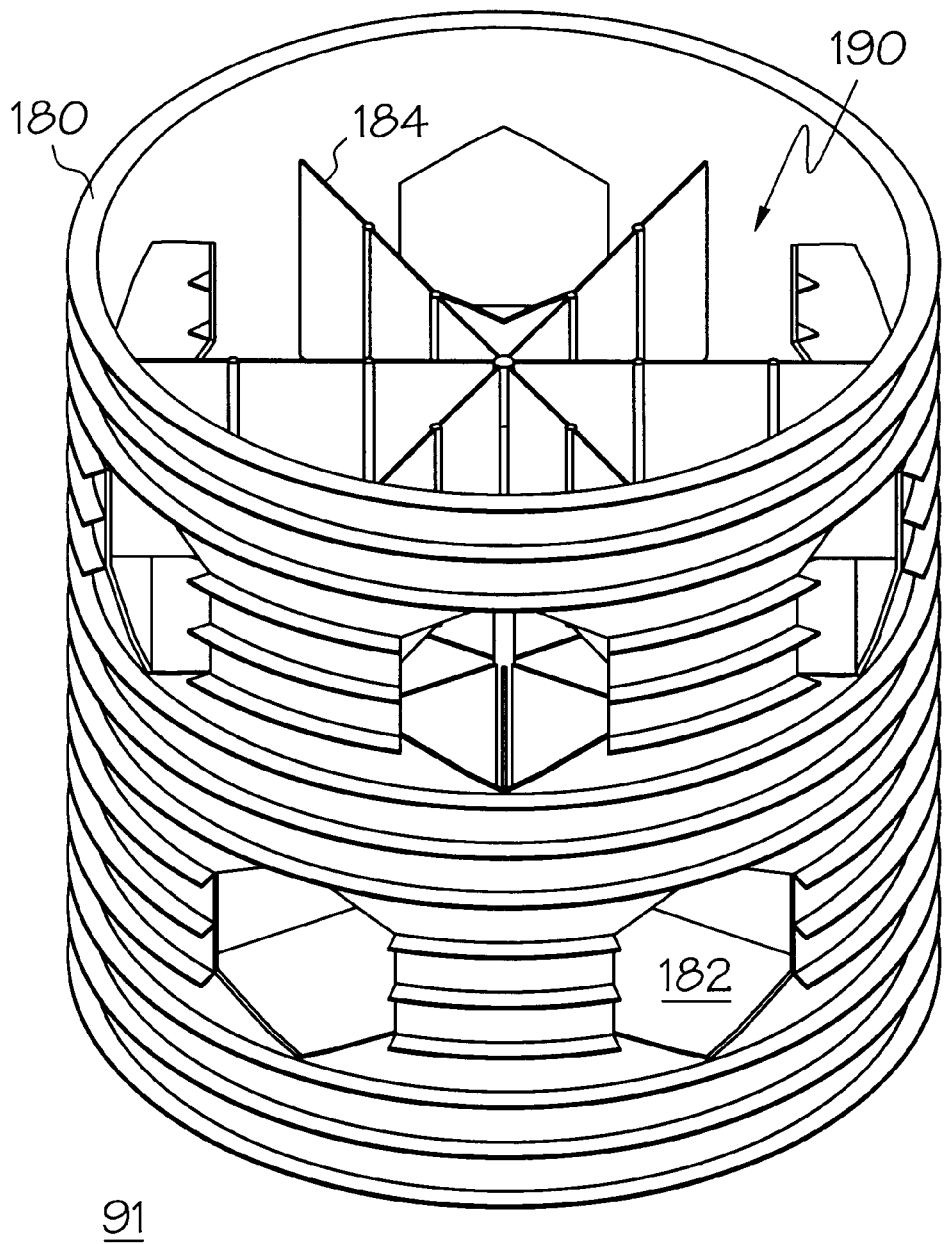
FIG. 10 is a perspective view illustration of an exemplary type of fixed film packing element used in the tank in FIG. 9.

The first and second bioreactors 40 and 88 have first and second tanks 76 and 94, respectively, filled with packing media 90 which provides an attachment surface. Microbes used to clean up solids-free wastewater 8 are well known in the field and are fed into the first and second tanks 76 and 94 in sufficient quantity to attach to the packing media 90 and breed under conditions explained below to form a fixed film on the packing surfaces. A more detailed illustration of a packing element 91 is illustrated in FIG. 10. The packing element 91 has a cylindrical wall 180 with substantially large holes 182 through the wall. The interior of the packing element 91 has cross members 184 which brace the wall 180 and provide additional surface area for growing the fixed film of microbes used in the bioreactors. The large holes 182 and fluid passageways 190 between the cross members 184 and the wall 180 allow the continuous flow of wastewater and oxygen to move up through the first and second tanks 76 and 94 and help maintain optimum conditions for the aerobic and anoxic microbe's biological processes. The packing element 91 are disposed randomly as illustrated in FIGS. 8 and 9. The sizing of the first and second bioreactors varies depending upon concentration of wastes in the wastewater 8 and average daily flow volume of the wastewater.

Referring to FIGS. 8 and 9 again, after the liquid resides in the first bioreactor 40 for a predetermined period, it exits the first tank 76 through a first tank outlet 75 near a top 73 of the first tank. The liquid level 74 in the first bioreactor is controlled by the level or height in the tank of the first tank outlet 75. A first liquid outflow 79 discharged from the first tank outlet 75 flows by gravity through a transfer pipe 78 into the second bioreactor 88. If necessary, the first liquid outflow 79 can bypass the second bioreactor 88 by opening a third shutoff valve 82 and closing a fourth shutoff valve 84. However, during normal operations, the flow is directed to the second bioreactor.

After the liquid resides in the second bioreactor for a predetermined period, it exits the second tank 94 through an outlet near the top of the tank 94. The liquid level 74 in the second bioreactor is controlled by a second tank outlet 125 near a top 73 of the second tank 94. After the liquid enters the second tank outlet 125, it flows by gravity through an exit pipe 96 into the secondary holding tank 116 or can be discharged directly through pipe 134 by first opening valve 132 and then closing valves 104, 106. If necessary, the flow from the second bioreactor can be recirculated back to the primary holding tank by closing the second closing valve 106 and opening the first closing valve 104, which allows recirculated liquid to travel through the recirculation loop 108. Under normal operation conditions, the liquid flows through a trap 110, which prevents uncontrolled air and pressure loss from the bioreactors, and enters the secondary holding tank through an inlet 114.

Liquid in the secondary holding tank is pumped to one or a combination of the following alternatives: irrigation nozzles, toilet recirculation, on-site disposal (mound system, leach field, etc.) or NPDES discharge. The liquid in the secondary holding tank 116 exits through a discharge pipe 140 by way of a float activated discharge pump 124. Alternatively, the liquid in the secondary holding tank 116 can be pulled from the tank using a centrifugal pump and a drop pipe or be discharged by gravity. A high-level float switch 122 indicates a high liquid level, which activates an alarm and deactivates the holding tank pump 46. All electrical devices in the secondary holding tank are connected to a junction box 120 which is connected to the main PLC. Access to the secondary holding tank is gained using a riser 118, which extends from the tank top to the ground surface.

Figure 11:
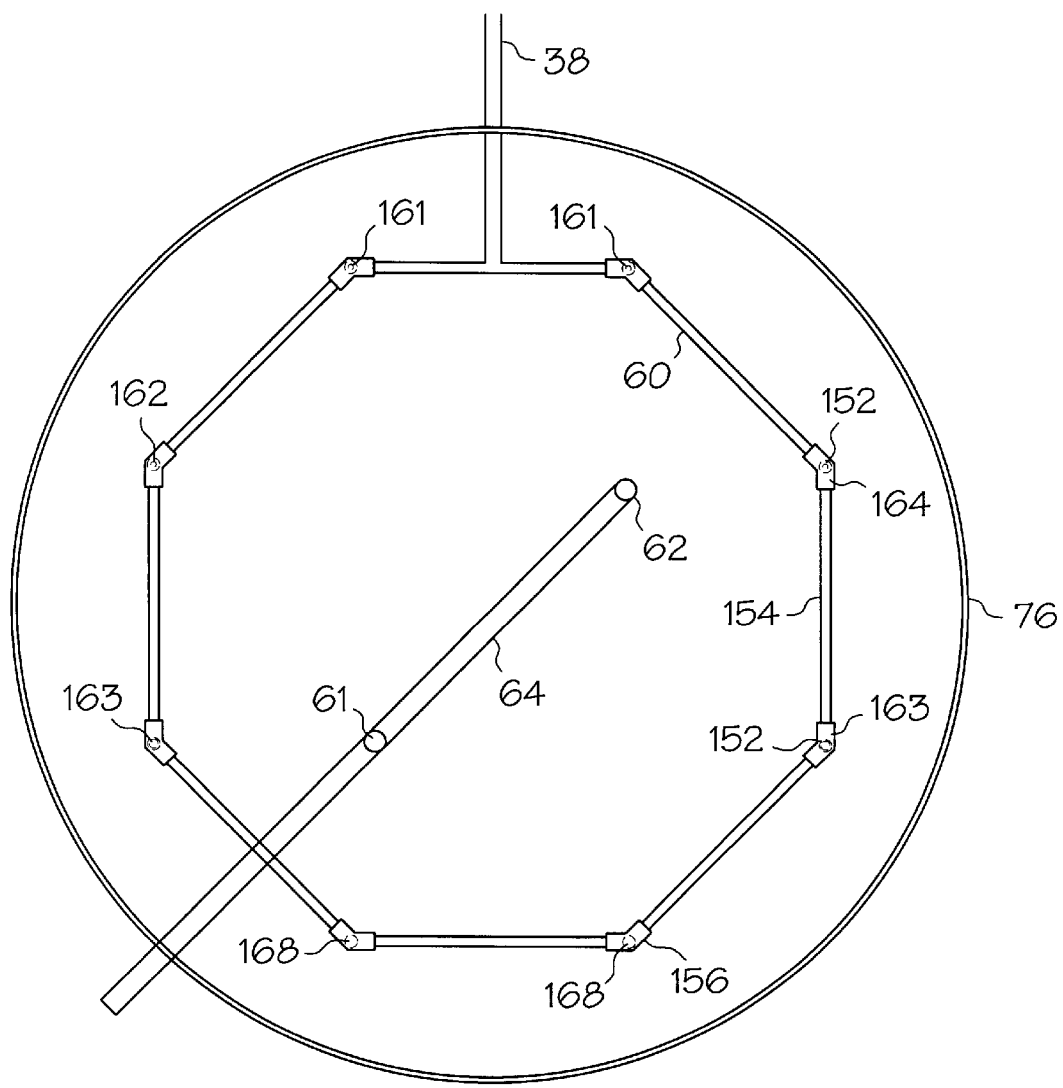
FIG. 11 is a schematic illustration of an air distribution manifold and a fluid distribution manifold in the tank in FIG. 9.
Figure 12:
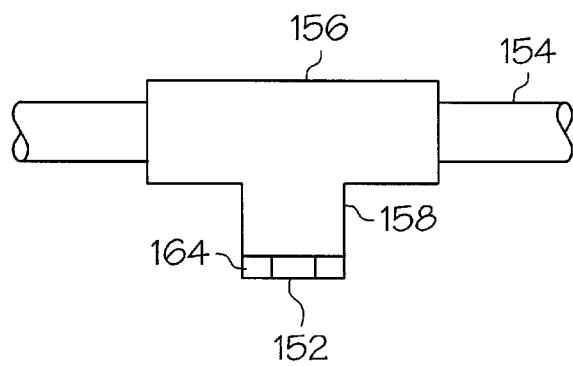
FIG. 12 is a schematic illustration of a distributor used on the manifolds in FIG. 11.

Referring to FIG. 8, the wastewater 8 enters the first and second bioreactors 40 and 88 through manifold inlets 59 of fluid distribution manifolds 60. One of the manifold inlets 59 is connected to the first pressure line 38 near a bottom of the first tank 76 and another manifold inlet 59 of the other fluid distribution manifold 60 is connected to the transfer pipe 78 near the bottom of the second tank 94. The fluid distribution manifold 60 connected to the first pressure line 38 serves as an outlet for the first pressure line. The fluid distribution manifold 60 connected to the transfer pipe 78 serves as an outlet for the transfer pipe. Illustrated in FIGS. 11 and 12 is an exemplary embodiment of the fluid distribution manifold 60, which is designed and installed to prevent the accumulation of sediment in the bottom 77 of the bioreactor. The fluid distribution manifolds 60 have downwardly facing fluid flow openings 152 that discharge fluid downwardly towards the bottoms 77 of the tanks 76, 94.

The fluid distribution manifold 60 is illustrated in the exemplary embodiment as an octagon with 8 straight pipes 154 connected with T fittings 156 that have downwardly extending collars 158. Bushings 164 are fitted within the collars 158 and include the fluid flow openings 152 to discharge the fluid downwardly towards the bottom of the tanks. The fluid flow openings in the bushings are used to help regulate the fluid flow through the fluid distribution manifolds.

In the exemplary embodiment, the fluid flow openings 152 are graduated in size radially across the fluid distribution manifold 60 and increase in size going away from the pressure line 38 in the first tank 76 and from the transfer pipe 78 in the second tank 94. The graduation provides a substantially uniform flow of water through each of the bushings 164. One example of the graduated fluid flow openings includes first, second, third, and fourth sets of openings 161, 162, 163, and 168 being 0.5Δ, 0.75Δ, 1.Δ, and 1.25Δ, respectively, as illustrated in FIG. 11. However, the fluid flow openings may vary in size and quantity depending upon wastewater concentration and wastewater flow.

Air is supplied to the bioreactors using a blower 130. The air from the blower 130 travels through air lines 63 to an air distribution manifold 64 and enters the bioreactors through first and second air outlets 61 and 62 of air distribution manifolds 64 at the bottom 77 of the first and second tanks 76 and 94. The first and second air outlets 61 and 62 are graduated in size, increase in size a direction going away from the air lines 63, and are arranged in the air distribution manifolds 64 to disperse the air uniformly in the tanks as illustrated in FIG. 11. In one example, the graduated first and second air outlets 61 and 62 are 0.5Δ and 0.75Δ, respectively, as illustrated in FIG. 11. However, the air outlets may vary in size and quantity and configuration depending upon wastewater concentration, wastewater flow, and desired air flow and distribution.

Access to the bottom interior of the bioreactors is done using the bottom manways 70. Access to the top interior of the bioreactors is done using the top manways 72. The bioreactors can be drained using drains 126 located at the bottom 77 of the tanks. High-level float switches 98 indicate a high liquid level in the bioreactors, which activates an alarm and deactivates the holding tank pump 46. During start-up of the system, nutrients can be injected into the first and second bioreactors 40 and 88 using first and second nutrient feed pipes 52 and 80, respectively. Water quality of the system 10 is monitored using a influent sample port 48 in first pressure line 38 outside of the first tank and an effluent sample port 86 and effluent sample port 112.

Referring to FIGS. 8 and 9, the airflow to the bioreactors is regulated using air control valves 68 and is monitored using airflow meters 66. The air exits the first and second bioreactors through vent pipes 100 located at the top 73 of the tanks. The vent pipes 100 are connected to a vent manifold 136, which is vented to an exhaust pipe 144 extending outside of the bioreactor building 42. To achieve the desired pressure in the bioreactors, an air vent control valve 138 is installed in the vent manifold 136. Pressure relief valves 128 are installed as a safety precaution, and also insure that the maximum desired operating pressure for the bioreactors is not exceeded. All the mechanical and electrical operations of the system are controlled using the PLC 44. The atmosphere inside the building is also regulated using the PLC.

To optimize aerobic and anoxic biodegradation conditions in the first and second bioreactors 40 and 88, respectively, airflow, dissolved oxygen, and pressure are controlled and regulated using a control system which incorporates airflow gauges and regulators, pressure sensing devices, and dissolved oxygen probes. These control devices are integrated through the PLC 44 to maintain the desired conditions in the bioreactor tanks. In the event the air supply blower malfunctions, an alarm 36 is activated and a back-up air supply blower is automatically activated. In addition to airflow and dissolved oxygen, temperature is a critical environmental parameter that must be regulated to optimize the biodegradation of the solids-free wastewater 8. In all known sanitary wastewater treatment systems, it is tacitly assumed that since the wastewater is driven or travels through pipe below ground that the temperature of the wastewater will be suitable to sustain biological activity (i.e., 45° F.±). This assumption is not always true to maintain an optimized rate of biodegradation. To achieve the temperature control within the bioreactors, a variety of temperature controls can be utilized. These include placing bioreactors in a heated building with heaters 142 such as is illustrated in FIG. 8, or alternatively using heat exchangers, emersion heaters and heating tapes or pads installed on insulated or buried tanks. The temperature can be regulated with a conventional thermostat. In the event the temperature is below or exceeds the desired temperature range, an alarm 36 is activated using the PLC 44.

The present invention includes a method for treating sanitary waste liquid effluent (wastewater 8 from one of the sources) or other biologically degradable liquid waste effluent utilizing fixed film bioreactors in series and controlling environmental parameters in a manner that optimizes the microbial growth of desired microbes. Exemplary parameters listed below are for a liquid influent to the first bioreactor with a BOD of 400 ppm. Higher or lower influent BOD concentrations can be treated using the parameters specified below and calculating new parameters in a directly proportional manner relative to BOD. For a BOD influent of 400 ppm, the design and environmental parameters are as follows:

A) A heavier-than-water packing media that can serve as a substrata for a film of microbes sufficient to achieve BOD reduction of 0.1–0.4 lbs of BOD per day per cubic foot of packing. Commercially available packing media is well known in the field.

B) A resident time in each bioreactor should be at least 12 hours and need be no longer than 24 hours.

C) To maximize BOD reduction in the first bioreactor, an aerobic environment is maintained. To insure that the aerobic environment is maximized, an ambient airflow between 0.034 to 0.067 cubic feet of air per minute (cfm) per cubic foot of packing is maintained. This airflow is sufficient to maximize fixed film microbe growth, yet, slow enough to prevent suspended growth conditions in the bioreactor. The airflow is supplied to the bioreactors through the first and second air outlets 61 and 62 of the air distribution manifolds 64 as illustrated in FIG. 11.

D) To maximize the nitrification/denitrification processing in the second bioreactor, an anoxic environment is maintained (i.e., oxygen deficient, but not anaerobic). This establishes an oxygen environment that promotes the growth of the required Nitrobacteraceae (Nitrosomonas and Nitrobacter). To achieve this condition, the airflow should be maintained between 0.013 to 0.027 cfm air per cubic foot of packing.

E) To promote optimal microbe growth, the temperature within the bioreactor is maintained within limits. The temperature in the first bioreactor is maintained between 45° F. and 120° F. The temperature of the second bioreactor is maintained between 55° F. and 120° F. Temperature can be regulated by placing the bioreactors in an enclosed structure, using emersion heaters, heat exchangers, and/or heat tapes.

Figure 14:
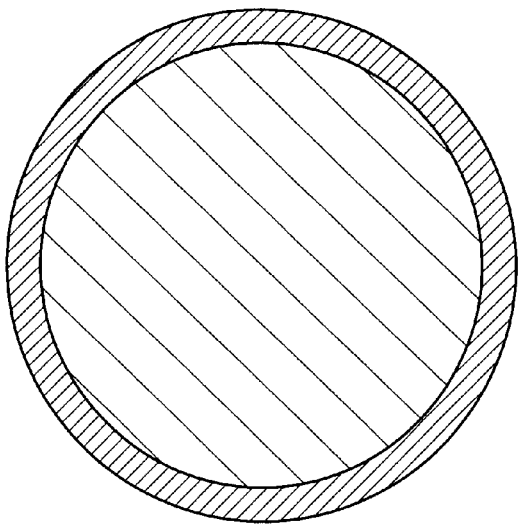
FIG. 14 is a graphical illustration of anoxic and aerobic zones across a width along the axis of the first tank in FIG. 1.
Figure 13:
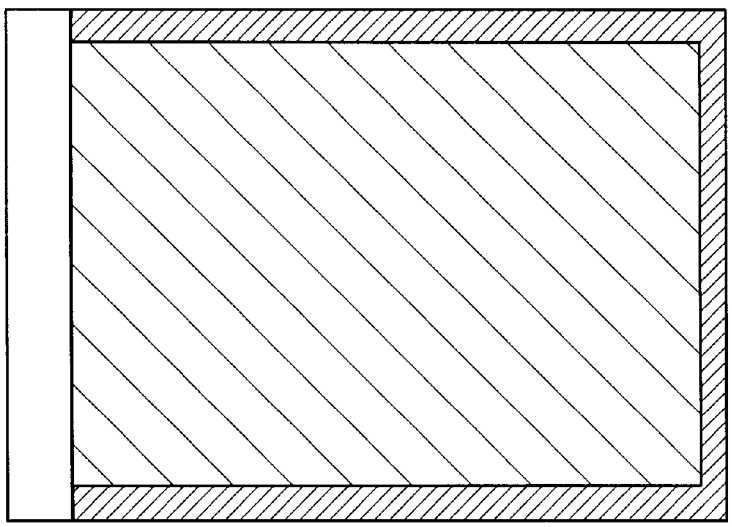
FIG. 13 is a graphical illustration of anoxic and aerobic zones through an axis of the first tank in FIG. 1.
Figure 16:
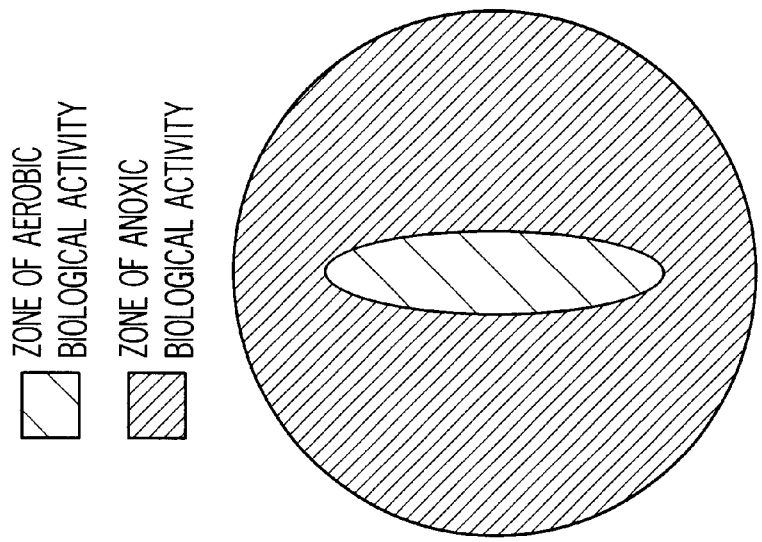
FIG. 16 is a graphical illustration of anoxic and aerobic zones across a width along the axis of the second tank in FIG. 1.
Figure 15:
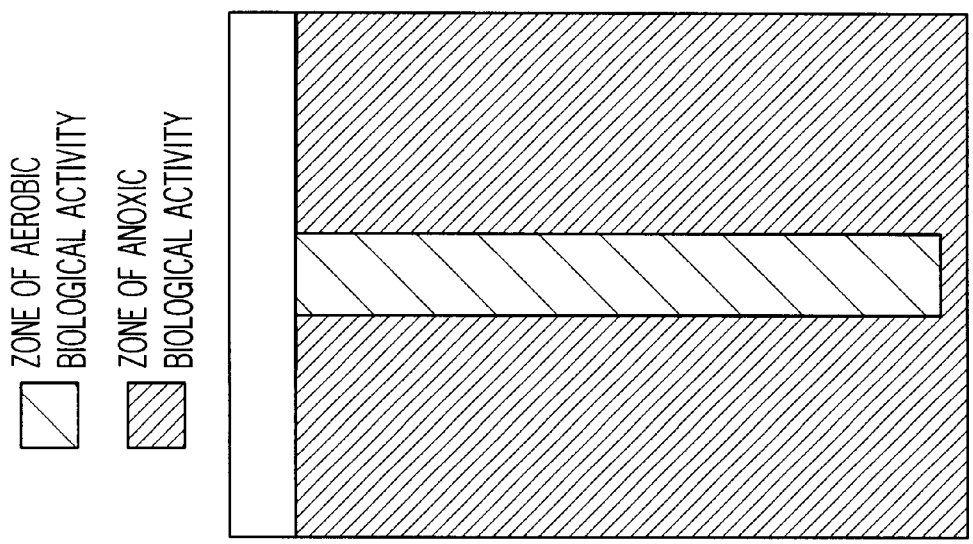
FIG. 15 is a graphical illustration of anoxic and aerobic zones through an axis of the second tank in FIG. 1.

The aerobic and anoxic conditions maintained in the first and second bioreactors 40 and 88 are not 100% throughout the first and second tanks 76 and 94, respectively. The aerobic and anoxic conditions are substantially such as illustrated in FIGS. 14 and 15 for the aerobic first bioreactor 40 and in FIGS. 16 and 17 for the anoxic second bioreactor 88.

Accordingly, what is desired to be secured by Letters patent of the united states is the invention as defined and differentiated in the following claims:

What is claimed is:

1. wastewater treatment plant comprising:
   in serial fluid flow relationship;
   a wastewater source,
   a wastewater treatment plant,
   a discharge site,
   said wastewater treatment plant having in serial fluid flow relationship an aerobic bioreactor in fluid flow communication with said wastewater source and an anoxic bioreactor in fluid flow communication with said discharge site, and
   fixed film packing in first and second tanks of said aerobic and anoxic bioreactors, respectively.

2. A wastewater treatment plant as claimed in claim 1 further comprising a primary holding tank between said wastewater source and said aerobic bioreactor.

3. A wastewater treatment plant as claimed in claim 2 further comprising a first pumping means for pumping liquid out of said primary hold tank through a first pressure line leading into said first tank and a pressure line outlet in a bottom of said first tank.

4. A wastewater treatment plant as claimed in claim 3 wherein said first pumping means comprises a float activated primary hold tank pump which is activated by a normal level float switch.

5. A wastewater treatment plant as claimed in claim 4 further comprising:
   a first tank outlet near a top of said first tank,
   a transfer pipe in fluid communication with said first tank outlet and leading into a bottom of said second tank, and
   a transfer pipe outlet at said bottom of said second tank.

6. A wastewater treatment plant as claimed in claim 5 further comprising an air supply means to supply air to said bottoms of said first and second tanks.

7. A wastewater treatment plant as claimed in claim 6 further comprising:
   a second tank outlet near a top of said second tank,
   an exit pipe in fluid communication with said second tank outlet, and
   said exit pipe disposed in fluid communication between said discharge site and said anoxic bioreactor.

8. A wastewater treatment plant as claimed in claim 6 further comprising:
   a second tank outlet near a top of said second tank,
   an exit pipe in fluid communication with said second tank outlet, and
   said exit pipe disposed in fluid communication with a secondary holding tank wherein said secondary holding tank is disposed in fluid communication between said discharge site and said anoxic bioreactor.

9. A wastewater treatment plant as claimed in claim 8 further comprising a bioreactor building enclosing said aerobic and anoxic bioreactors and a heater suitably connected to said building to control temperature inside of said building and said bioreactors.

10. A wastewater treatment plant as claimed in claim 9 wherein said air supply means comprises:
    at least one blower connected in fluid communication with air lines,
    said airlines lead to air distribution manifolds near said bottoms of said first and second tanks,
    said air distribution manifolds having air outlets.

11. A wastewater treatment plant as claimed in claim 10 further comprising a first fluid distribution manifold connected to said first pressure line near said bottom of said first tank and a second fluid distribution manifold connected to said transfer pipe near said bottom of said second tank.

12. A wastewater treatment plant as claimed in claim 11 further comprising fluid flow openings facing downwardly from said fluid distribution manifolds towards said bottom of said tanks.

13. A wastewater treatment plant as claimed in claim 12 wherein each one of said fluid distribution manifolds further comprises:
    straight pipes located between and connected by T fittings,
    wherein said T fittings have downwardly extending collars,
    bushings fitted inside of said collars, and said fluid flow openings in said bushings.

14. A wastewater treatment plant as claimed in claim 13 wherein said bushings in each of said fluid distribution manifolds have graduated size fluid flow openings radially across said fluid distribution manifold which increase in size going away from a manifold inlet of each of said fluid distribution manifolds.

15. A wastewater treatment plant as claimed in claim 14 wherein said air outlets are graduated in size and increase in size going away from said air lines.

16. A wastewater treatment plant as claimed in claim 15 further comprising:

vent pipes located at said tops of said tanks, said vent pipes connected to a vent manifold, said vent manifold is vented to an exhaust pipe extending outside of said bioreactor building, and a vent air control valve is operably installed in said vent manifold.

17. A wastewater treatment plant as claimed in claim 16 further comprising a controller operably connected to said valves and heater in said bioreactor building and said controller programmed to control temperature inside of said building and said bioreactors and to control process of said plant.

18. A wastewater treatment plant as claimed in claim 17 wherein said controller is programmed to maintain a first temperature in said aerobic bioreactor between 45°F. and 120° F. and a second temperature in said anoxic bioreactor between 55°F. and 120° F.

19. A wastewater treatment plant as claimed in claim 18 wherein said controller is further programmed to maintain airflow from said blower through said aerobic bioreactor between 0.034 to 0.067 cubic feet of air per minute (cfm) per cubic foot of packing in said aerobic bioreactor and through said anoxic bioreactor between 0.013 to 0.027 cfm of air per cubic foot of packing in said anoxic bioreactor.

20. A wastewater treatment plant as claimed in claim 19 wherein said controller is further programmed to provide a wastewater resident time in each of said bioreactors in a range of between 12 and 24 hours.

21. A wastewater treatment plant as claimed in claim 20 wherein said wastewater source is a agricultural facility.

22. A wastewater treatment plant as claimed in claim 20 wherein said wastewater source is a municipal wastewater treatment facility.

23. A wastewater treatment plant as claimed in claim 20 further comprising a septic tank between said wastewater source and said primary holding tank.

24. A wastewater treatment plant as claimed in claim 23 wherein said wastewater source is a convenience store.

25. A wastewater treatment plant as claimed in claim 23 wherein said wastewater source is a commercial source.

26. A wastewater treatment plant as claimed in claim 23 wherein said wastewater source is a residential source.

27. A wastewater treatment plant as claimed in claim 23 wherein said wastewater source is a plurality of residential houses having wastewater sewer pipes connected in fluid flow communication to said septic tank.

28. A wastewater treatment plant as claimed in claim 23 wherein said discharge site is a leach field.

29. A method for treating solids-free wastewater, said method comprising in serial flow relationship the following steps:

flowing solids-free wastewater from a wastewater source to a bottom of an aerobic bioreactor, flowing the wastewater from a top of the aerobic bioreactor to a bottom of an anoxic bioreactor, flowing the wastewater from a top of the anoxic bioreactor out of the anoxic bioreactor, and flowing the wastewater to a discharge site.

30. A method as claimed in claim 29 further comprising maintaining a first temperature in the aerobic bioreactor between 45° F. and 120° F. and a second temperature in the anoxic bioreactor between 55° F. and 120° F.

31. A method as claimed in claim 30 further comprising maintaining an airflow from the blower through first bioreactor between 0.034 to 0.067 cubic feet of air per minute (cfm) per cubic foot of packing in the aerobic bioreactor and through the anoxic bioreactor between 0.013 to 0.027 cfm of air per cubic foot of the packing in the anoxic bioreactor.

32. A method as claimed in claim 31 further comprising flowing the wastewater through the bioreactors to provide a wastewater resident time in each of the bioreactors in a range of between 12 and 24 hours.

33. A method as claimed in claim 32 further comprising flowing the wastewater through a primary holding tank before flowing the wastewater to the bioreactors.

34. A method as claimed in claim 33 further comprising flowing the wastewater through a septic tank before flowing the wastewater to the primary holding tank.

35. A method as claimed in claim 33 further comprising flowing the wastewater through a secondary holding tank between the anoxic bioreactor and the discharge site.

36. A method as claimed in claim 35 wherein the discharge site is a leach field.

37. A method as claimed in claim 35 wherein the discharge site is a leach field.

38. A method as claimed in claim 35 wherein the discharge site is a body of water.

* * * * *